(12) United States Patent
Trovato

(10) Patent No.: US 6,183,364 B1
(45) Date of Patent: Feb. 6, 2001

(54) SIMULATED ENVIRONMENT USING PROCEDURAL ANIMATION IN A SIMULATED CITY

(76) Inventor: Karen I. Trovato, 269 Barger St., Putnam Valley, NY (US) 10579

( * ) Notice: Under 35 U.S.C. 154(b), the term of this patent shall be extended for 368 days.

(21) Appl. No.: 08/576,621

(22) Filed: Dec. 21, 1995

(51) Int. Cl.[7] ................................................ A63F 9/22
(52) U.S. Cl. ............................................................ 463/32
(58) Field of Search .................................. 463/30, 31, 32, 463/33, 41, 43; 380/4; 370/277, 278

(56) References Cited

U.S. PATENT DOCUMENTS

| 5,473,687 | * | 12/1995 | Lipscomb et al. | ................... | 380/4 |
| 5,546,382 | * | 8/1996 | Fujino | ................... | 370/277 |
| 5,616,079 | | 4/1997 | Iwase et al. | ................... | 463/32 |

* cited by examiner

*Primary Examiner*—George Manuel

(57) ABSTRACT

An electronic game uses electronic map data and an environment grower to create a rich environment. An avatar maintenance system further enhances the game environment. The game is then sufficiently complex to be used by thousands of users.

21 Claims, 6 Drawing Sheets

SIMULATED ENVIRONMENT USING PROCEDURAL ANIMATION IN A SIMULATED CITY

I. BACKGROUND OF THE INVENTION

A. Field of the Invention

The invention relates to the field of software to be used in networks.

B. Related Art

Current electronic games are limited in the number of users that they can accommodate, typically no more than a handful. This limitation is partly because the hardware and software have not been designed for more users. However, multiuser hardware and software is well known and readily available for game designers to use. More importantly, limitation on the number of users of games is due to the complexity of creating virtual environment which contains enough data to accommodate large numbers of users. Ideally, each user needs to have his or her own game environment which interface to the game environments of other users. If the number of users becomes very large, such as 10,000, the amount of data required to create a unique game environment becomes impossibly expensive to generate.

II. SUMMARY OF THE INVENTION

The object of the invention is to create an electronic environment which has enough data to accommodate very large numbers of users at once.

The object is achieved by using software-enhanced real data from electronic maps.

III. BRIEF DESCRIPTION OF THE DRAWING

The invention will now be described by way of non-limitative example with reference to the following drawings.

IV. DETAILED DESCRIPTION OF THE PREFERRED EMBODIMENTS

Figure 1:
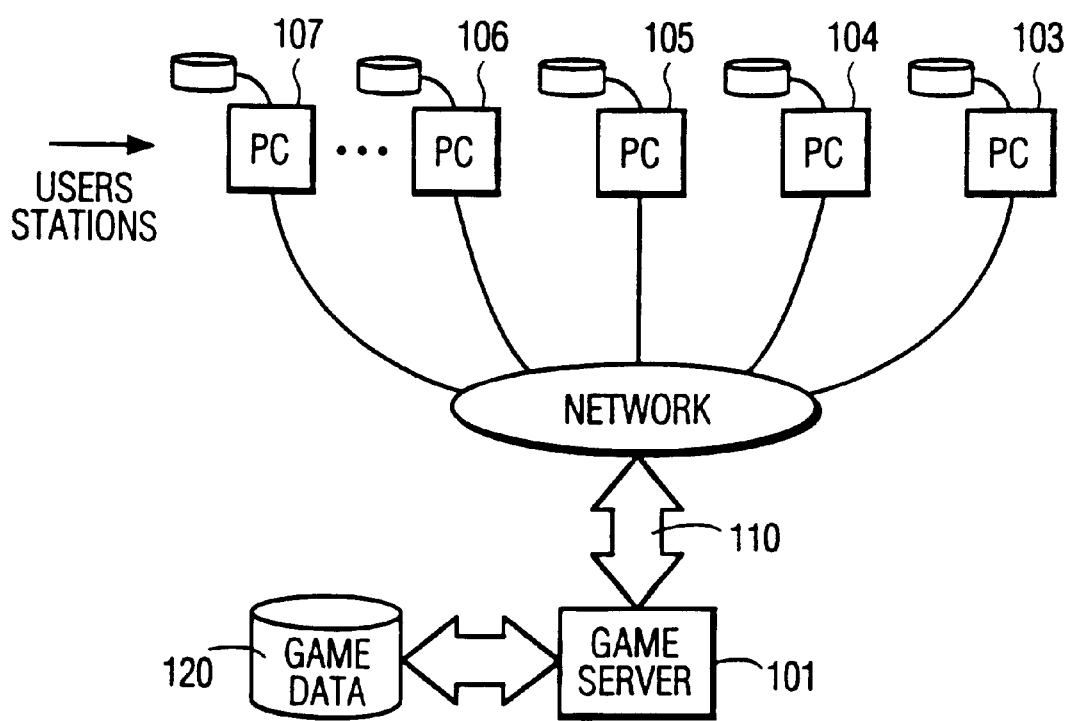
FIG. 1 shows a network on which the game according to the invention can run.

In order to accommodate a very large number of users, an electronic environment must run on a network, as illustrated in FIG. 1. A server 101, with a high speed network connection 110 will run the game according to the invention. The server 101 can be, for instance, a Sun Sparc20. The connection 110 should allow for high rates of data transfer to and from the server, for instance a T1 line receiving large quantities of data from the network 102. The individual users need only have ordinary phone lines. Alternatively, the server 101 can maintain a large number of ports over ordinary phone lines to individual users who call in. The server 110 can run game software or any other software which requires a rich environment. The network 102 may be any suitable large network, such as the Internet.

Users, each situated at their own stations 103–107, will interface with the server 101 via the network 102. User interface stations can be standard IBM compatible personal computers.

Figure 2A:
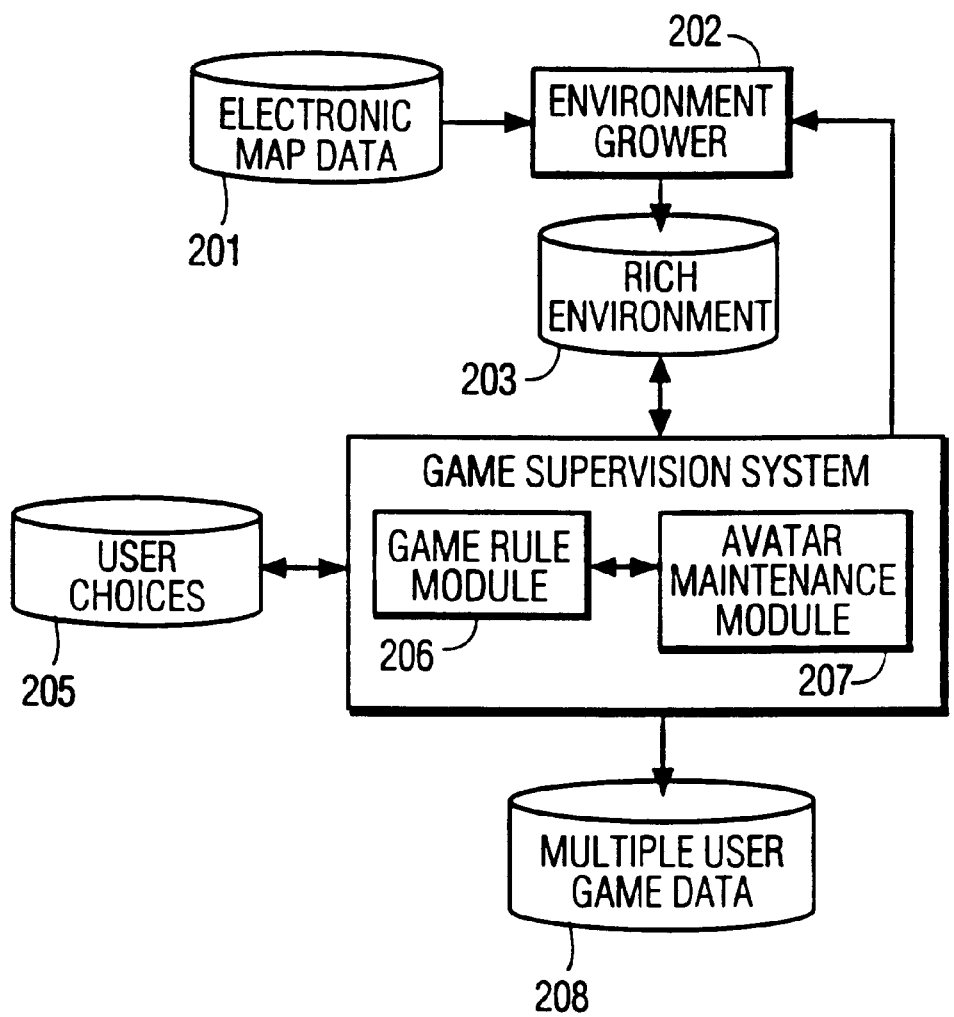
FIG. 2a shows a system for running the environment of the invention.

FIG. 2a shows one embodiment of a system for generating an environment in accordance with the invention. While it is virtually impossible to create enough fictitious data to maintain 10,000 game environments, in fact the real world an environment which maintains billions of people and is quite complex. Electronic maps 201 have already digitized enough real world data to provide places for many digital users to play. Particularly useful maps for this purpose are available on the market from Navigation Technologies, 740 East Arques Ave, Sunnyvale Calif. 94086-3833. These maps have a great deal of detail for the purposes of automobile navigation, but also include points of interest, such as hotels, restaurants, museums, gas stations, parking lots, and tourist attractions.

However, the maps alone do not create a rich environment. They are two dimensional maps. In order to enrich the user environment, the maps are preferably software enhanced by growing a rich environment using an environment grower 202. An example of such an environment grower is set forth in Lindstrom et al., "Level-of-Detail Management for Real-time Rendering of Phototextured Terrain", GVU Technical Report GIT-GVU-95-06, Georgia Institute of Technology, and Koller et al, "Virtual GIS; A Real-Time 3d Geographic Information System", GVU Technical Report GIT-GVU-95-14, Georgia Institute of Technology. The output of the environment grower is a rich environment 203, such as a simulated city, suitable for use by multiple users. Such an environment growing module is typically implemented using software code though it could also be hard wired.

The environment 203 is input to a game supervision system 204 which includes a game rule module 206. The game rule module interacts with a memory, which stores user choices 205, as well as with the environment 203 to create the game. The game rule module can be any standard network game.

In general, user choices will be expressed in terms of simple commands, such as "go to the treasure" or "stab my neighbor". Other movement or action commands can be input directly by a joy stick or other gesture sensor. These commands should have a format which is as condensed as possible in order to reduce input output times. Preferably therefore changes in representation of the avatars representing the various users should be generated largely automatically. An avatar maintenance module 207 continually updates the avatar appearances so that the game will be dynamic rather than static. The avatar maintenance module not only responds to user choices 205, but also keeps the avatars moving in an entertaining way even when no changes in user choices are entered. In this way, if one user goes to the kitchen to get a snack, his or her neighbors in the game environment need not detect the user's absence or be bored by his or her non-activity. Alternatively, the avatar maintenance module may be used to create the impression that more users are playing than are actually signed on. Real users can be substituted for artificial avatars at any time during the game.

A suitable avatar maintenance module is described in Perlin, "Real Time Responsive Animation with Personality", IEEE Trans. on Visualization and Computer Graphics, Vol. 1, No. 1, March 1995, pp. 5–15 and Perlin, "Live Paint: Painting with Procedural Multiscale Textures", Computer Graphics Proceedings, Annual Conference Series, 1995, pp 153–160. Such an avatar maintenance module is typically implemented in software code, but could also be hardwired.

A game rule module server might create multiple games in the same environment. Users might wander from game to game in that environment.

Figure 2B:
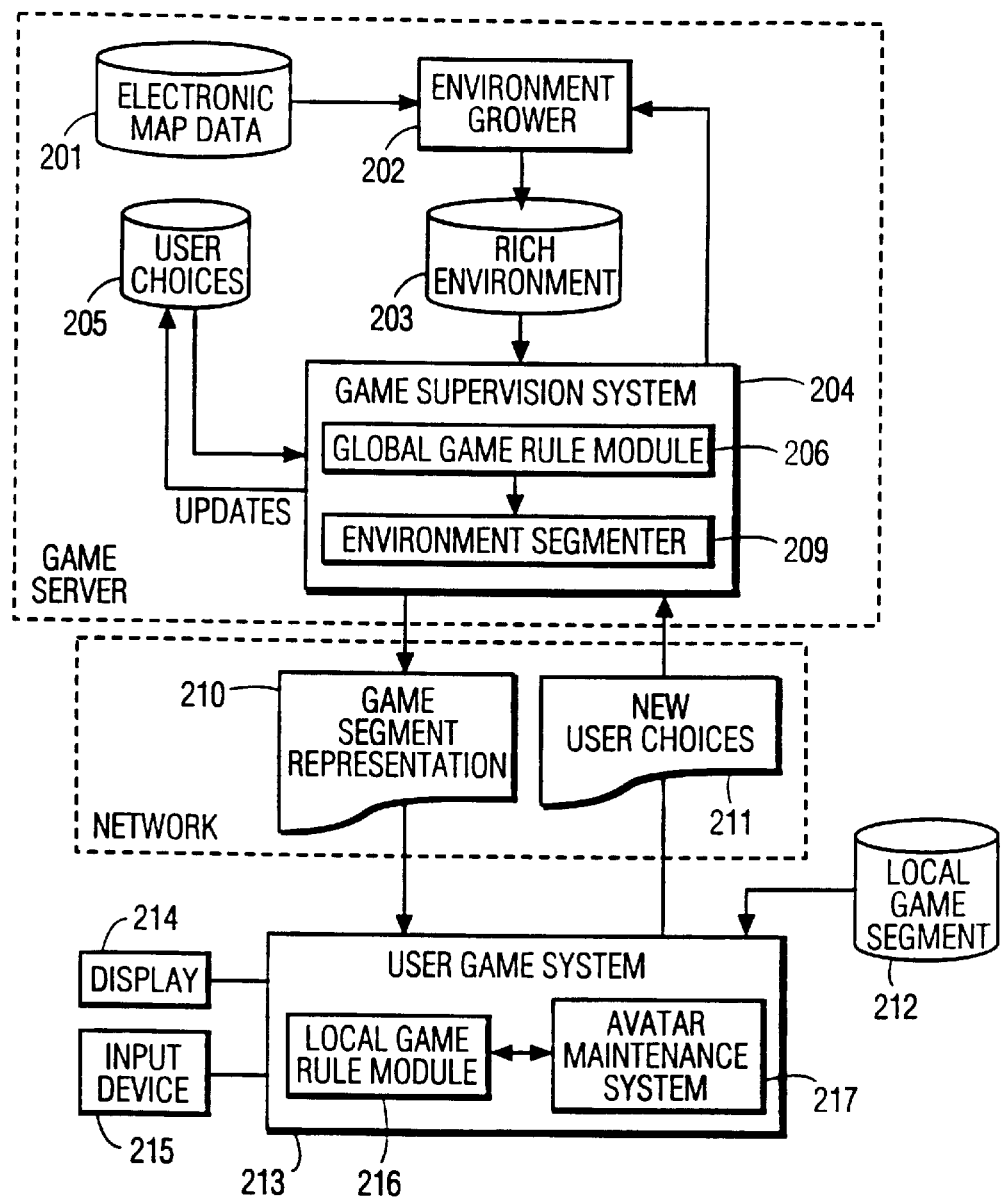
FIG. 2b shows an alternative embodiment of the system.

An alternative embodiment of a game system in accordance with the invention is shown at FIG. 2b. This embodiment seeks to minimize data transfer by distributing game processing to local work stations. In this alternative embodiment, an environment segmenter 209 sends only a representations of a segment 210 of the game to any one user. The user's local station 213 includes a local version of the game rule module 216. The local game rule module 216 receives the game segment representation 210 from the network and sends new user choices 211 back to the network. The local game module 216 interacts with the user via a display 214 and an input device 215, such as a keyboard and/or a pointer device. The local game module maintains a complete local game segment 212 which is updated by the user's choices, the game segment representation, and a local avatar maintenance module 217. Putting the avatar maintenance module 217 in the local station and maintaining a complete local game segment 212 reduces the amount of data transfer over the network.

User choices can trigger the game supervision system to choose a new part of the electronic map data and 201 and trigger the environment grower 202 to grow some more environment.

Figure 2C:
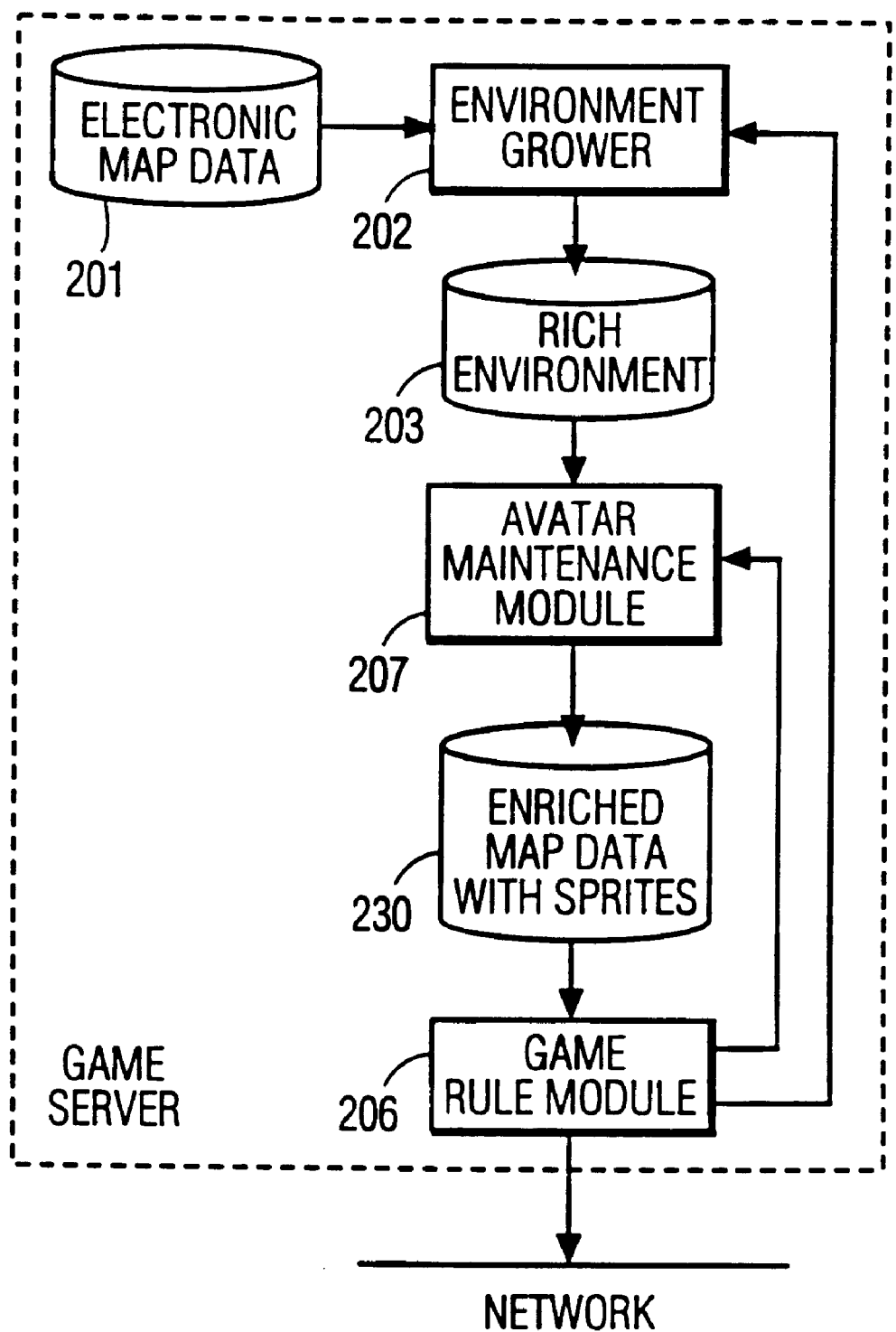
FIG. 2c shows another alternative embodiment of the system.

A third alternative embodiment is shown in FIG. 2c. Here electronic map data is fed to an environment grower 202 to create enriched map data 203. The avatar maintenance module 207 adds avatars to the map data and stores the combination in memory 230. The memory then stores a representation of avatars interacting with the enhanced electronic map data. The game rule module 206 then uses the environment stored at 230. If a new piece of map is desired, the game rule module 206 must ask the environment grower for it. If a change of avatars is to be triggered by user choices, the game rule module 206 must communicate this the avatar maintenance module 207.

Those of ordinary skill in the art may devise any number of enhancements or alternative ways of combining the elements described above.

Figure 3:
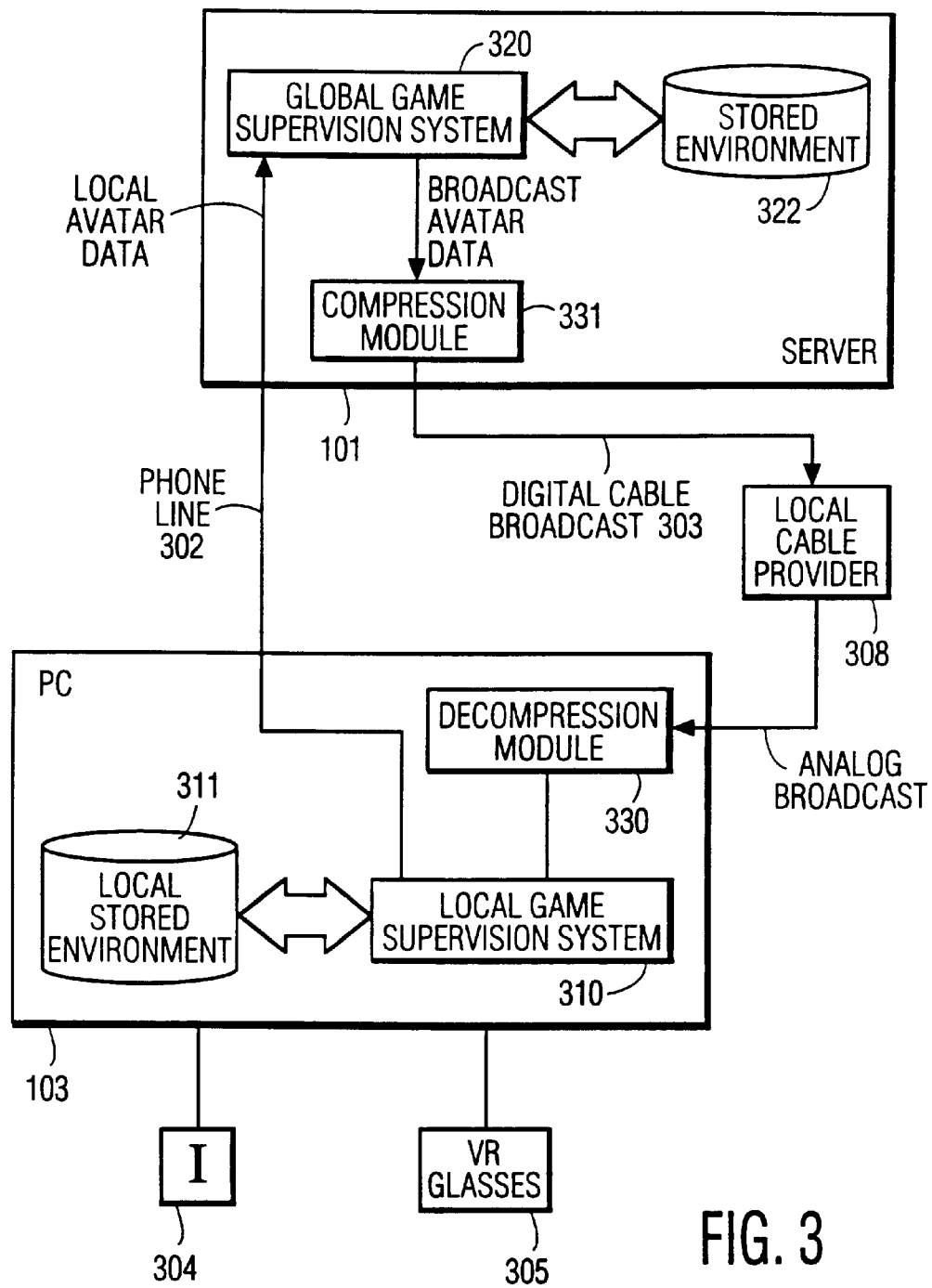
FIG. 3 shows still another alternative embodiment of the system.

FIG. 3 another embodiment of the invention. PC 103 renders a current point of view of a virtual world using game supervision module 310 and local stored environment 311. The local stored environment is generated according to the method of FIG. 2c. The local stored environment can be generated locally, broadcast to the PC at the start of the game, or broadcast to the PC on a periodic basis. The local game supervision module, taking input from a local input device 304, generates local avatar data. The term "avatar" is a term of art which was first used in N. Stephenson, *Snowcrash* (Bantam Books 1993). Other terms of art for this concept include the word "sprite". The avatar represents the PC user's persona in the virtual world. A current state of the avatar is transmitted via phone line 302 or other equivalent back channel to the server 301. The server 301 takes all of the signals from phone line 302 and other similar sources of information. Game supervision module 320 combines all of the avatars and calculates their interactions, using the stored environment 322. Game supervision module 320 then creates a broadcast form for all of the avatars, which is preferably digital. The broadcast form may be compressed by compression module 307 before being broadcast, e.g. via satellite or cable, over transmission channel 303 to PC 103 and other users. A local cable provider 308 may convert the broadcast signal to an analog form for the PC 103, if necessary.

The combined broadcast signal is in the form of states for other avatars in the region used by the local PC user. Compression 330 and decompression 331 can be used to make communication more efficient.

The local input control 304 can be any standard input device such as a keyboard, joy stick, trackball, or infrared remote control. Local input control can also be via a virtual reality input system such as a tactile resistance device or VR data gloves. The display on the PC can be adapted for use with 3D glasses 305.

Similarly, in the environment of FIG. 1, the PC's can maintain the rich environment and receive packet type messages off of the internet, analogously with mobile radio type applications. The PC's of all the figures can be equipped with the various input and output devices described for FIG. 3. The server of FIG. 1 can also transmit data in a sequential concatenated form any combined form whether digital or analog, compressed or uncompressed.

Figure 4:
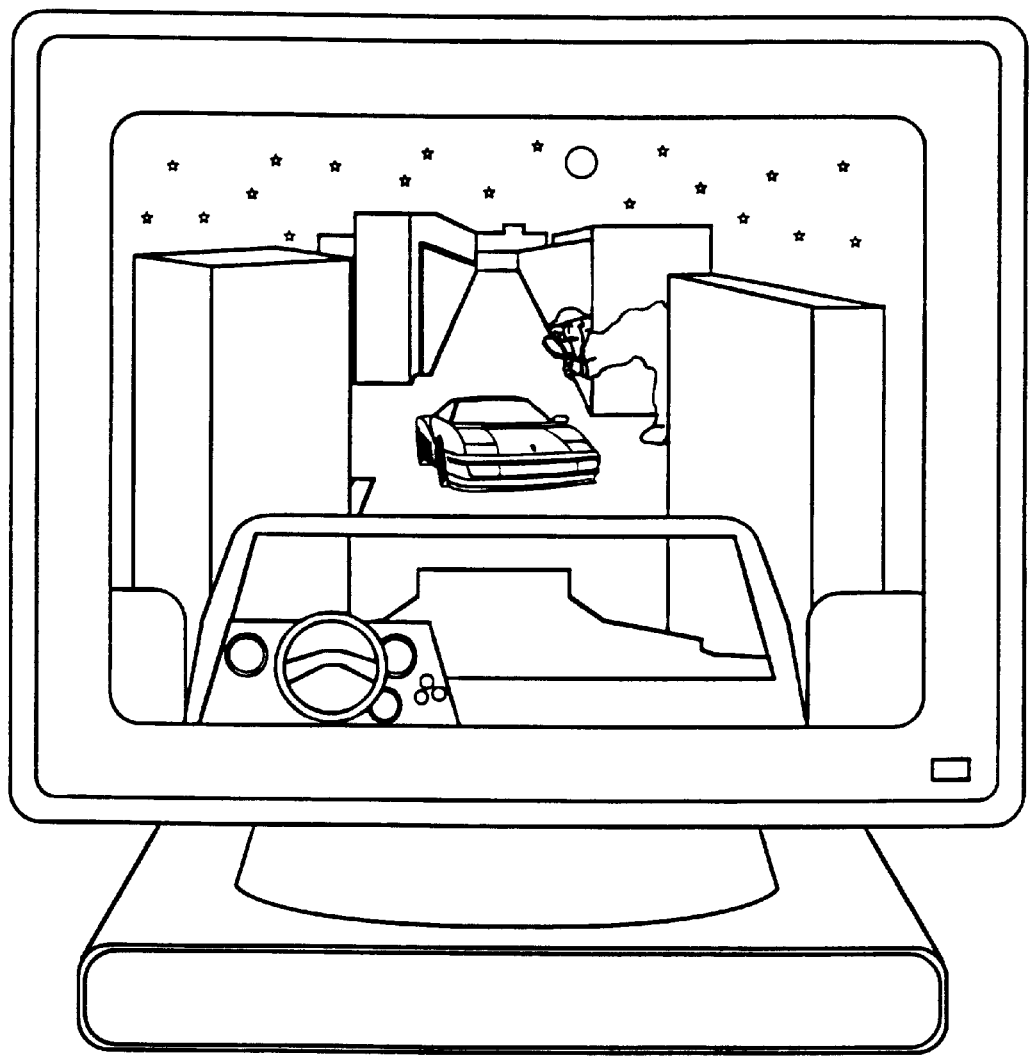
FIG. 4 shows a screen of a video game using the environment of the invention.

FIG. 4 shows a sample screen for a simplified version of a game using an environment according to the invention.

What is claimed is:

1. Computer software stored in a computer memory comprising means for receiving electronic map data; and environment growing code for growing an environment from the map data.

2. The software of claim 1 further comprising avatar maintenance code for maintaining avatars in the environment.

3. A computer method comprising inputing electronic map data into a computer system, and in the system, growing a simulated environment from the electronic map data.

4. A computer memory storing the environment grown according to the method of claim 3.

5. A computer system comprising the memory of claim 4;

processor means for maintaining an electronic game that interacts with the environment stored in the memory.

6. The computer system of claim 5 wherein the processor is a game server and further comprising means for communicating data relating to the simulated environment to a remote processor.

7. The computer system of claim 6 wherein the means for communicating comprises one of a network, the internet broadcast cable lines, and phone lines.

8. The computer system of claim 5 wherein the data is a portion of the simulated environment.

9. The computer system of claim 5 wherein the portion comprises avatar data.

10. The computer system of claim 5 wherein the processor is a remote processor and further comprising means for communicating data relating to the environment with a central server.

11. The computer system of claim 10 wherein the means for communicating comprises one of a network connection, the internet, and a phone line.

12. The computer system of claim 10 wherein the data is a portion of the simulated environment.

13. The computer system of claim 12 wherein the portion comprises avatar data.

14. The method of claim 3 further comprising the step of, in the computer system, automatically maintaining avatars in the simulated environment.

15. A computer memory storing a simulated environment produced according to the method of claim 14.

16. A computer system comprising:
   central processor means for maintaining an environment with avatars in that environment;
   means for communicating portions of the environment to distributed processor means.

17. The system of claim 16 wherein the portions are the avatars.

18. The system of claim 16 wherein the central processor is a game server.

19. The system of claim 16 wherein the communicating means comprises one of a network connection, the internet, and a cable broadcast connection.

20. The system of claim 21 wherein the communicating means is also for receiving local data from the distributed processor.

21. The system of claim 20 wherein the communicating means comprises a phone connection for receiving local data from the distributed processor.

* * * * *